Jan. 21, 1964    N. S. FITZHUGH    3,118,692
PLASTIC HOSE COUPLING
Filed July 30, 1959    2 Sheets-Sheet 1

INVENTOR
NELSON S. FITZHUGH

BY

ATTORNEYS

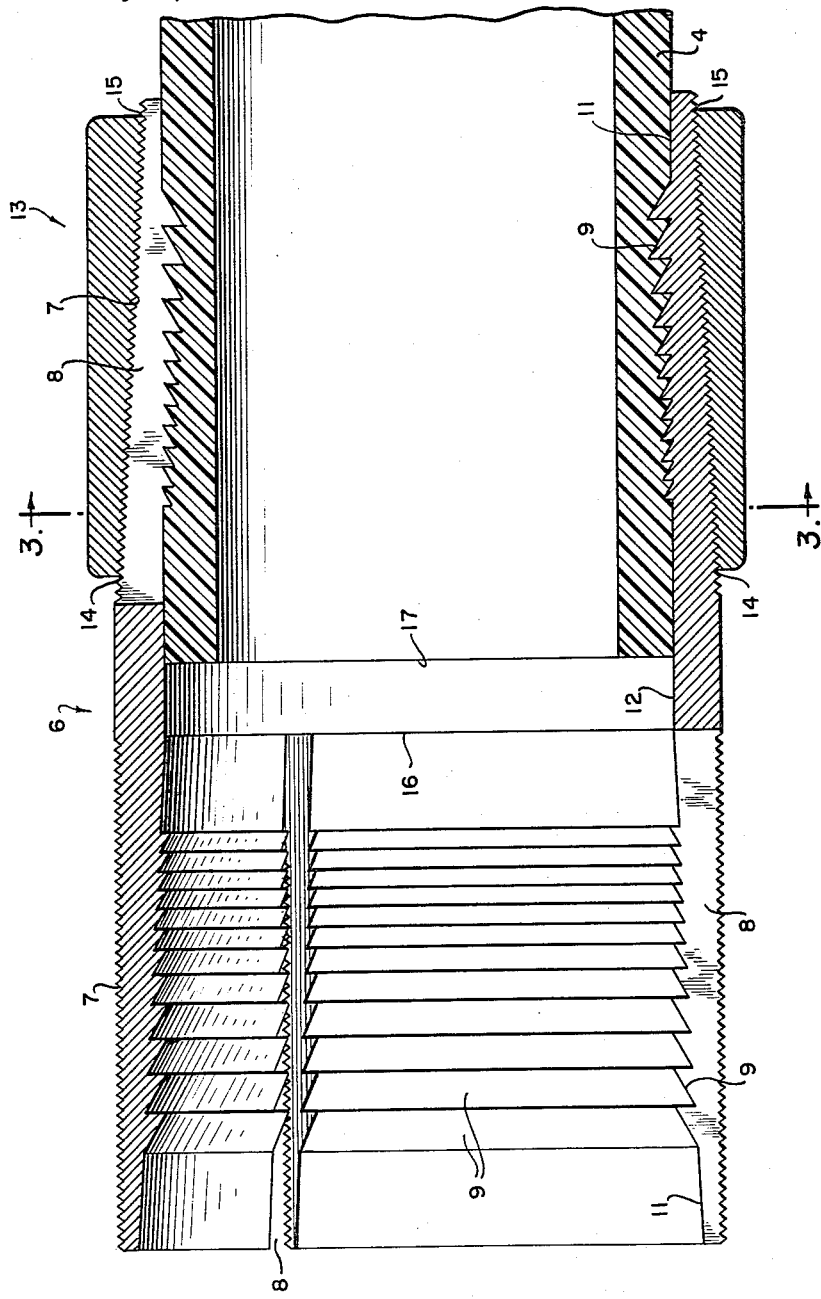

United States Patent Office 3,118,692
Patented Jan. 21, 1964

3,118,692
PLASTIC HOSE COUPLING
Nelson S. FitzHugh, 1107 Powhatan St., Alexandria, Va.
Filed July 30, 1959, Ser. No. 830,685
4 Claims. (Cl. 285—238)
(Granted under Title 35, U.S. Code (1952), sec. 266)

The invention described herein may be manufactured and used by or for the Government of the United States of America for governmental purposes without the payment of any royalties thereon or therefor.

The present invention relates to a plastic hose coupling for coupling two lengths of plastic hose simply and with no restriction which would impede flow in the hose.

Hoses and pipes made of plastic are rapidly gaining in popularity since, in general, plastic is lighter and cheaper than most other commercially available material and may be obtained with other desirable qualities for special applications. However, difficulty is experienced in the connection of lengths of hoses to one another, particularly in high pressure systems.

Probably the best method of connection in present day use is vulcanization of the two sections. However, vulcanization is difficult to perform in the field since it requires special equipment, skill, and a great deal of time. Furthermore, for a temporary connection, the hose must be cut to separate the sections when the job has been completed.

Various hose clamps have been used but virtually all of these require a tube to be placed inside of the hose at the joint. The tube is difficult to insert and after the connection is made impedes the flow of liquid or gases through the hose causing back pressure at the joint, turbulence in the flow and possible rupture of the hose or slipping of the joint.

In the present invention the inner tube or restrictor of the prior art is omitted and an outer tube is used. The outer tube is threaded externally from each end to a point less than half the length of the tube. A plurality of grooves are cut from each end longitudinally of the tube to a point which again is less than half the total length. The internal surface of the tube near each end contains a series of serrations which grip the tube and force the ends of the hose toward one another when a tapered sleeve is threaded onto the tube from each end. The device is easily applied. requires no special tools or extraordinary skill to apply, and places no restriction inside the hose to impede the flow of water and cause back pressure or turbulence.

It is therefore an object of this invention to provide an end fitting, or coupling, for use with plastic pipe or hose which is simple and easy to apply.

An additional object is the provision of a plastic hose coupling which does not restrict the flow or intensify pressure at the joint.

Other objects and many of the attendant advantages of this invention will be readily appreciated as the same becomes better understood by reference to the following detailed description when considered in connection with the accompanying drawings in which:

FIG. 2 is a vertical section taken along the longitudinal axis of the embodiment shown in FIG. 1.

Figure 1:
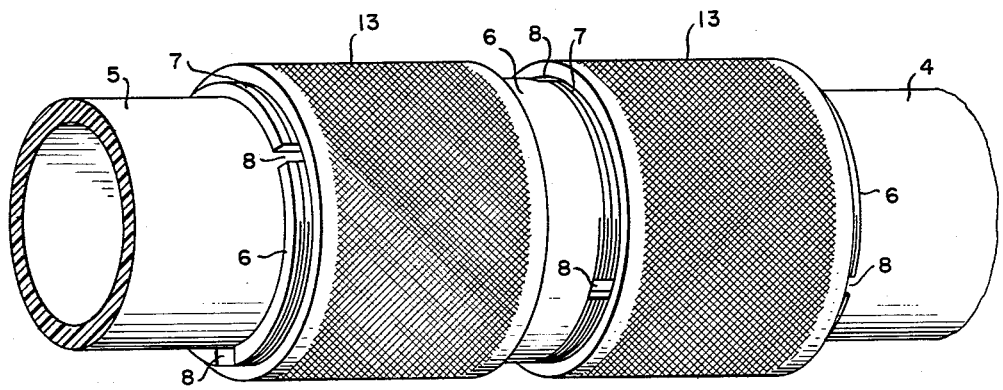
FIG. 1 is an oblique view of a preferred embodiment of the invention.

Referring now to the drawings, wherein like reference characters designate like or corresponding parts throughout the several views, there is shown in FIG. 1 (which illustrates a preferred embodiment) a plastic hose or pope 4 which is coupled to a second plastic hose or pipe 5 by means of coupling tube 6.

Figure 3:
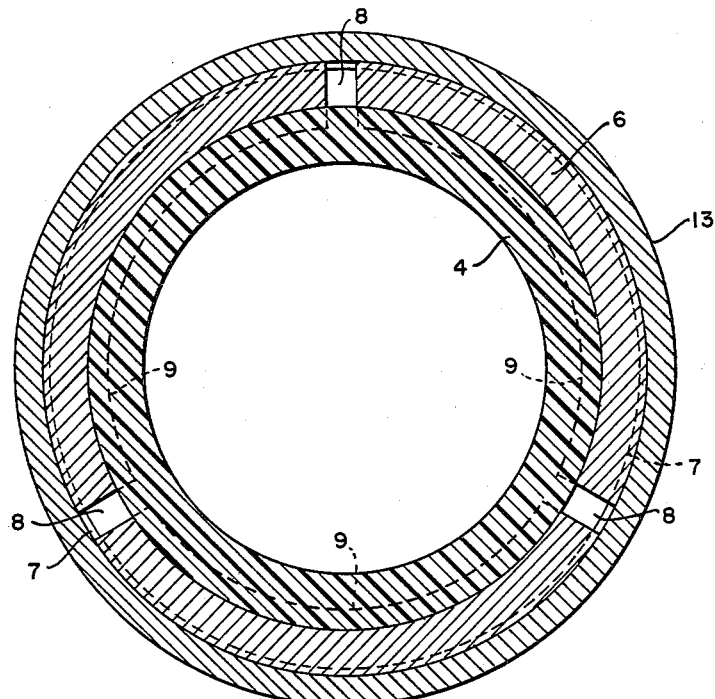
FIG. 3 is a vertical section taken on line 3—3 of FIG. 2.

Coupling tube 6 is cylindrical in shape as may be seen in FIG. 3 and has on its outer surface at each end a threaded portion 7 which extends from each end to a point slightly less than half the length of the tube. A series of slots 8 are cut in tube 6 from each end thereof again to a point slightly less than half the length of the tube. As can be seen in FIG. 1 and 3, the slots on opposite ends of the tube are staggered thus providing greater structural strength of the fitting. The internal surface of part of the slot portion of tube 6 is provided with a series of graduated circumferential serrations 9. As may be seen in FIG. 2, serrations 9 are formed with inner faces substantially perpendicular to the axis of tube 6 and outer faces oblique to the tube axis. In the inoperative state the innermost extremities of serations 9 are on a line with the smooth center portion 12 of the tube which is of fixed diameter as may be seen particularly in the left hand portion of FIG. 2. This makes possible the insertion of the hose into the tube with no obstruction as will be later described.

Threaded on each end of the tube 6 on threaded portion 7 is a tapered sleeve 13 which may be knurled on the outside surface thereof for easier gripping, or alternatively may include surfaces adatped for wrench gripping. The internal diameter of sleeve 13 at the clamp end 14 is greater than that at the hose end 15.

When it is desired to connect two sections of hose, a sleeve 13, hose end 15 first, is slipped over the end of each of the hose sections. Each of the hoses 4 and 5 is then slipped into tube 6 from opposite ends until the ends thereof abut at a point approximately in the center of the tube.

Tapered sleeves 13 are then threaded onto the ends of tube 6. The larger diameter of clamp end 14 of each of the sleves, which is meshed first, and the taper toward hose end 15 cause the diameter of the ends of tube 6 to become smaller as the sleeve is threaded further onto the tube. The serrations 9 on the internal surface of the coupling tube are forced into the hose and also force each hose further into the tube due to the lateral component of the movement of the serrations as the tube ends each pivot inwardly around a line 16 demarcating the ends of slots 8. This tends to seal the joint 17 between the hose ends.

When liquid under pressure is passed through the hose and coupling, the pressure within the hose causes radial epxansion of the hose thus sealing the hose against the clamp at center section 12, along serrated portion 9, and against end shoulder portion 11, thus eliminating any possibility of leaks. Since the hose ends are pushed tightly together, and since the inner surface of the hose joint is smooth no back pressure is developed which would tend to push the hose out of the clamp as in prior art devices.

It should be noted that the strength of the hose is weakened at the points where the serrations grip it. However, the end shoulder portions 11 grip the hose tightly due to radial pressure from within the hose and the above described absence of back pressure compensates for the loss in structural strength of the hose and eliminates any possibility of hose rupture at the coupling. Since there is no internal structure in the hose the pressure may be maintained at substantially constant value and no turbulence is produced.

It will also be realized by those skilled in the art that a device similar to that described may be used to couple plastic hose or pipe to a metal fitting of known type by utilizing a coupling of known design modified by the teachings of this invention. That is, the portion of the coupling used to grip the plastic hose or pipe will be equivalent to half the above desribed device while the portion for connecting the metal fitting will be of a conventional design.

Obviously many modifications and variations of the present invention are possible in the light of the above teachings. It should be understood of course that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A coupling for connecting two sections of plastic hose without restricting the flow path through the hose, comprising a tubular member externally threaded at each end thereof into which one end of each of said hose sections is adapted to be inserted, a plurality of longitudinal slots cut from each end to a point less than half the length of said tubular member, an internally threaded tapered sleeve adapted to be threaded large end first on each end of said tubular member, and a series of graduated circumferential serrations in each end of said tube, said serrations having inner and outer faces and said serrations being larger toward the ends of said tube than in the inner portion thereof.

2. The invention as defined in claim 1 wherein the inner faces of said serrations are in planes perpendicular to the longitudinal axis of said tubular member.

3. A hose connector comprising a tubular member externally threaded at an end portion thereof into which end a hose section is adapted to be inserted, a plurality of longitudinal slots cut from said end of said tubular member, and internally threaded tapered sleeve adapted to be threaded large end first on said externally threaded end portion, and a series of graduated circumferential serrations in said end of said tube, said serrations having inner and outer faces and said serrations being larger toward the end of said tube than in the inner portion thereof.

4. The invention as defined in claim 1 wherein the inner faces of said serrations are in planes substantially perpendicular to the longitudinal axis of said tubular member.

References Cited in the file of this patent

UNITED STATES PATENTS

| 512,252 | Kempshall | Jan. 2, 1894 |
| 1,257,852 | Hall | Feb. 26, 1918 |
| 1,955,930 | Oliver | Apr. 24, 1934 |
| 2,246,557 | Walters | June 24, 1941 |
| 2,326,292 | Dorman | Aug. 10, 1943 |
| 2,420,617 | Paquin | May 13, 1947 |
| 2,480,496 | Mercier | Aug. 30, 1949 |
| 2,501,619 | Schultess | Mar. 21, 1950 |
| 2,513,115 | Sprigg | June 27, 1950 |
| 2,927,807 | Campbell | Mar. 8, 1960 |

FOREIGN PATENTS

| 1,016,874 | France | Sept. 3, 1952 |